United States Patent
Allen et al.

(10) Patent No.: US 6,869,096 B2
(45) Date of Patent: Mar. 22, 2005

(54) CHILD CARRIER

(75) Inventors: Scott R. Allen, Fieldbrook, CA (US);
Steven J. Cole, Arcata, CA (US);
James R. Penny, Arcata, CA (US)

(73) Assignee: Watermark PaddleSports, Inc., Arcata, CA (US)

( * ) Notice: Subject to any disclaimer, the term of this patent is extended or adjusted under 35 U.S.C. 154(b) by 0 days.

(21) Appl. No.: 10/193,644

(22) Filed: Jul. 10, 2002

(65) Prior Publication Data

US 2003/0085551 A1 May 8, 2003

Related U.S. Application Data

(60) Provisional application No. 60/304,467, filed on Jul. 10, 2001.

(51) Int. Cl.[7] .................................................. B62B 1/00
(52) U.S. Cl. ........................ 280/642; 280/650; 280/647
(58) Field of Search .................................. 280/642, 644, 280/646, 650, 47.17, 47.25, 47.34, 47.38, 658, 652, 655, 655.1, 657, 639, 641, 643, 645, 42, 647, 648, 649, 651, 654, 659, 43.21, 47.11, 47.18, 47.26, 47.31, 47.371, 47.36, 32.6, 62; 403/99, 100, 102; 277/118, 344.12

(56) References Cited

U.S. PATENT DOCUMENTS

| | | | | |
|---|---|---|---|---|
| 4,191,397 A | * | 3/1980 | Kassai | 280/647 |
| 4,544,178 A | * | 10/1985 | Al-Sheikh et al. | 280/642 |
| 5,039,118 A | * | 8/1991 | Huang | 280/47.371 |
| 5,056,805 A | * | 10/1991 | Wang | 280/47.36 |
| 5,257,799 A | * | 11/1993 | Cone et al. | 280/642 |
| 5,364,119 A | * | 11/1994 | Leu | 280/647 |
| 5,460,399 A | * | 10/1995 | Baechler et al. | 280/650 |
| 5,476,275 A | | 12/1995 | Baechler et al. | |
| 5,577,744 A | * | 11/1996 | Parks | 280/32.6 |
| 5,674,165 A | | 10/1997 | Cohen et al. | |
| 5,829,826 A | * | 11/1998 | Ziccardi | 297/118 |
| 6,017,051 A | * | 1/2000 | Thimmig | 280/642 |
| 6,101,678 A | | 8/2000 | Malloy et al. | |
| 6,102,431 A | * | 8/2000 | Sutherland et al. | 280/642 |
| 6,478,327 B1 | * | 11/2002 | Hartenstine et al. | 280/642 |

* cited by examiner

Primary Examiner—Christopher P. Ellis
Assistant Examiner—Hau Phan
(74) Attorney, Agent, or Firm—Kolisch Hartwell, P.C.

(57) ABSTRACT

A child carrier includes a centrally located front wheel and two rear wheels joined by a frame assembly. The frame assembly has a hinge mechanism that permits adjustment of a handle between multiple operating positions, and easy opening and collapsing of the carrier.

15 Claims, 9 Drawing Sheets

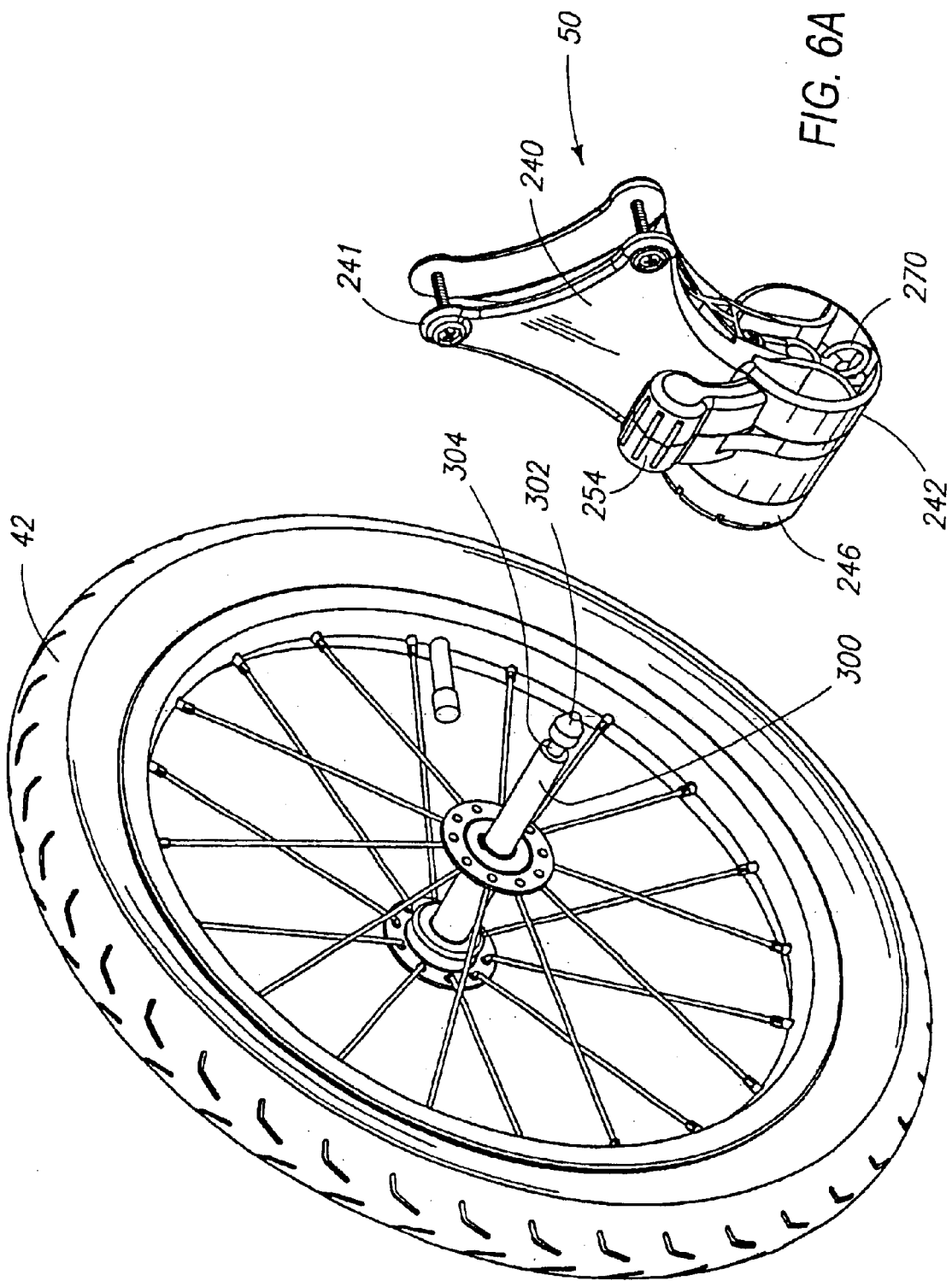

CHILD CARRIER

CROSS-REFERENCE TO RELATED APPLICATION(S)

This application claims the priority under 35 U.S.C. § 119 and applicable foreign and international law of U.S. Provisional Patent Application Ser. No. 60/304,467 filed Jul. 10, 2001 which is hereby incorporated by reference in its entirety for all purposes.

FIELD OF THE INVENTION

The invention relates to child carriers, particularly three-wheeled strollers that are suitable for running or walking over varying terrains.

BACKGROUND OF THE INVENTION

For years people have used strollers to transport babies and young children. Many different stroller designs have been developed to accommodate different types of uses and conditions. In recent years, a category of strollers have become popular because of their versatility for walking, jogging or hiking over varied surfaces such as roads, dirt trails, grass, cross-country, etc. These strollers typically have three relatively large wheels with air-pressured tires that provide good stability, speed, and comfortable riding characteristics. This type of carrier is sometimes referred to as a "jogging stroller" even though it is suitable for many uses other than jogging.

One problem with jogging strollers, is that they tend to be bulky making them difficult to store or transport. Some designs are partially collapsible, but are either too labor-intensive to collapse, or are not sufficiently compact when folded or disassembled. Accordingly, there is a need for jogging stroller designs that are easy to collapse into a sufficiently compact form for storage or transport.

Another problem with jogging strollers is that one stroller may not be suitable for use by people of different heights. One design may be fine for a relatively short person, but not comfortable or ergonomically healthy for a tall person, or vice versa. There is a need for a jogging stroller that can be easily adjusted for use by persons of different heights.

BRIEF DESCRIPTION OF THE DRAWINGS

FIG. 6A is an isometric view of a braking device and axle support structure employed in the child carrier shown in FIG. 1.

DESCRIPTION OF THE INVENTION

The invention provides improved child carrier devices that are easier to use, collapse, store, and transport compared to previous carriers. Typically, a child carrier has a centrally located front wheel, and two rear wheels, supported by a frame. The frame portion of a carrier includes a handle. A seat, for example, made of fabric or some other flexible material, is supported by the frame. A person controls the speed and direction of the carrier by pushing, pulling, and turning the handle of the carrier. A preferred embodiment of the invention provides handle positioning adjustment capability to accommodate operators of different sizes. Other embodiments of the invention provide hinging devices that allow easy and convenient transition between open and collapsed positions. Other embodiments of the invention provide reliable, easy-to-use, brake systems and wheel release mechanisms.

Figure 1:
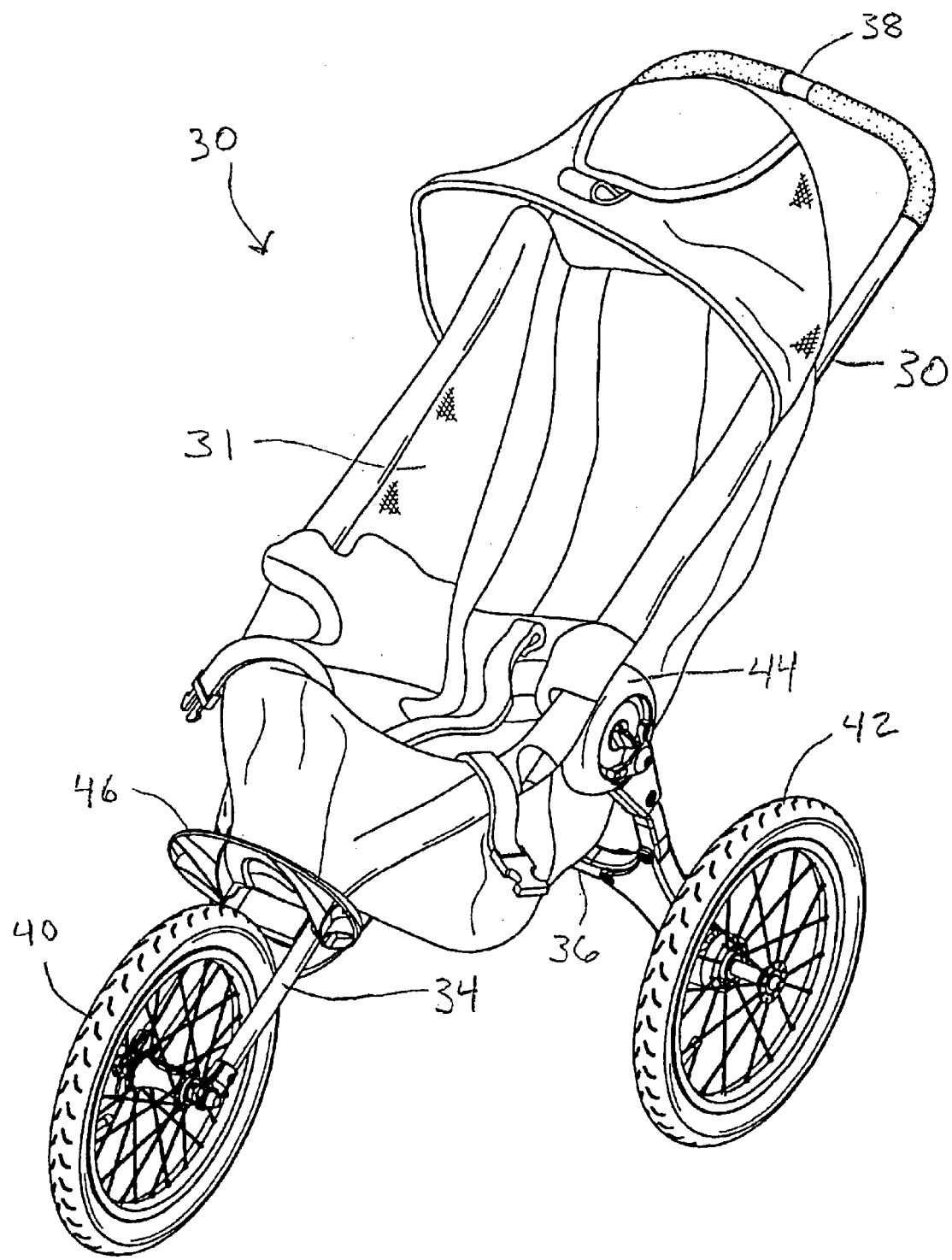
FIG. 1 is an isometric view of a child carrier.
Figure 2:
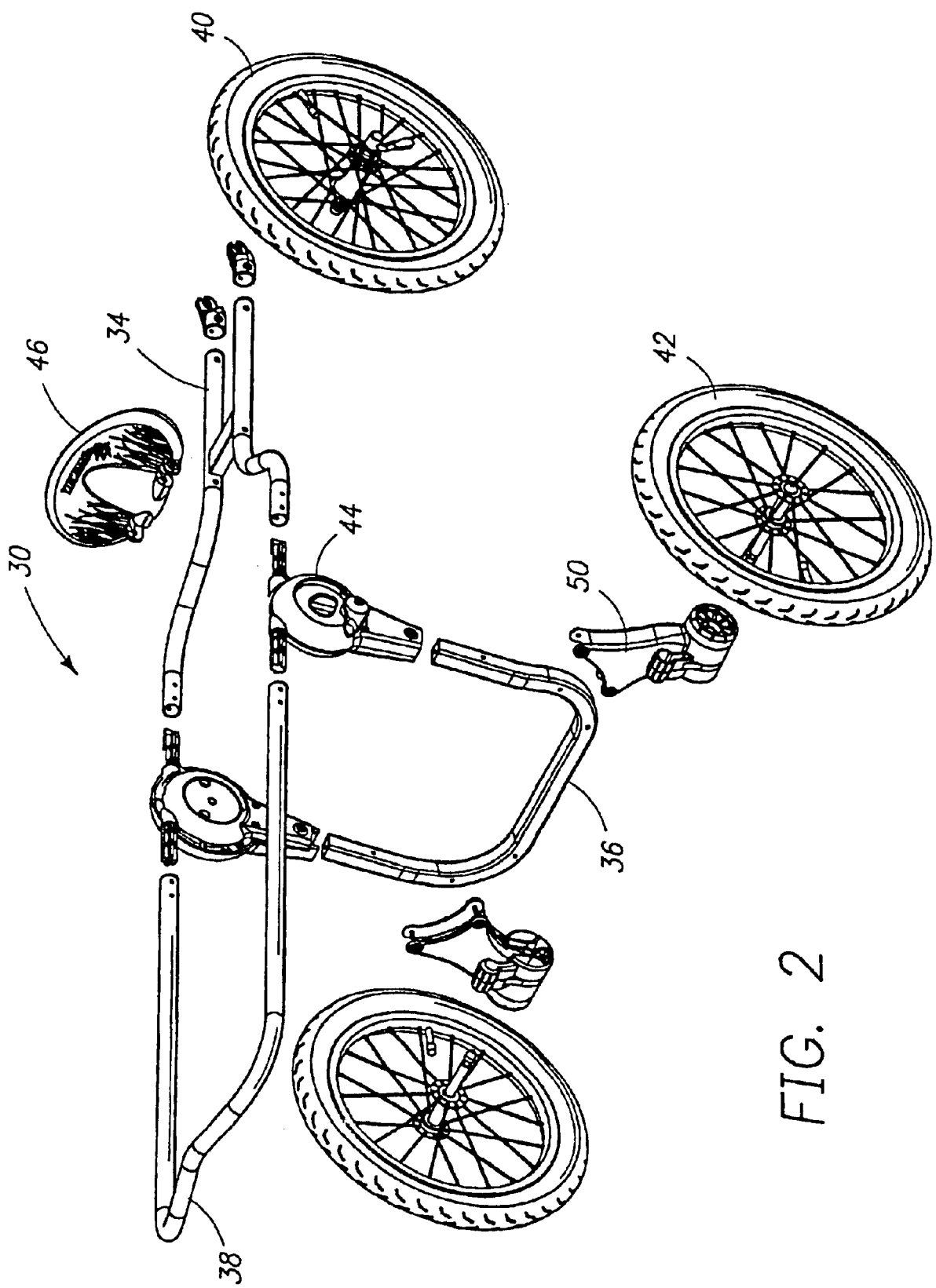
FIG. 2 is an exploded isometric view of the child carrier assembly of FIG. 1 without the fabric seat.

FIG. 1 shows a child carrier 30 with a flexible fabric seat 31 fastened to frame structure 32. As shown in FIG. 2, frame structure 32 includes front fork 34, rear wheel support 36, and handle 38. Handle 38 is U-shaped, however, any other rigid handle structure may be used, provided that it is easy to grip and hold by a person standing, walking or running behind carrier 30. Rear wheel support 36 is also generally U-shaped, but may be configured differently so long as it provides stable symmetrical support for rear wheels 42.

Front wheel 40 is supported centrally by front fork 34. A pair of wheels 42 are supported symmetrically by rear wheel support 36. Rear wheels 42 generally support most of the load. Hinge assembly 44 connects front fork 34, handle 38 and rear wheel support 36. Lateral hinges 44 may be manipulated, as explained in detail below, to allow relative pivoting of handle 38, and front fork 34 relative to each other and relative to rear wheel support 36. Fender 46 blocks water or debris from front wheel 40. Fender 46 may also function as a foot rest for a child being transported in carrier 30. Each of rear wheels 42 is retained by one of two rear wheel axle support structures 50. Axle support 50 structure also provides a breaking device, as described in more detail below.

Figure 3A:
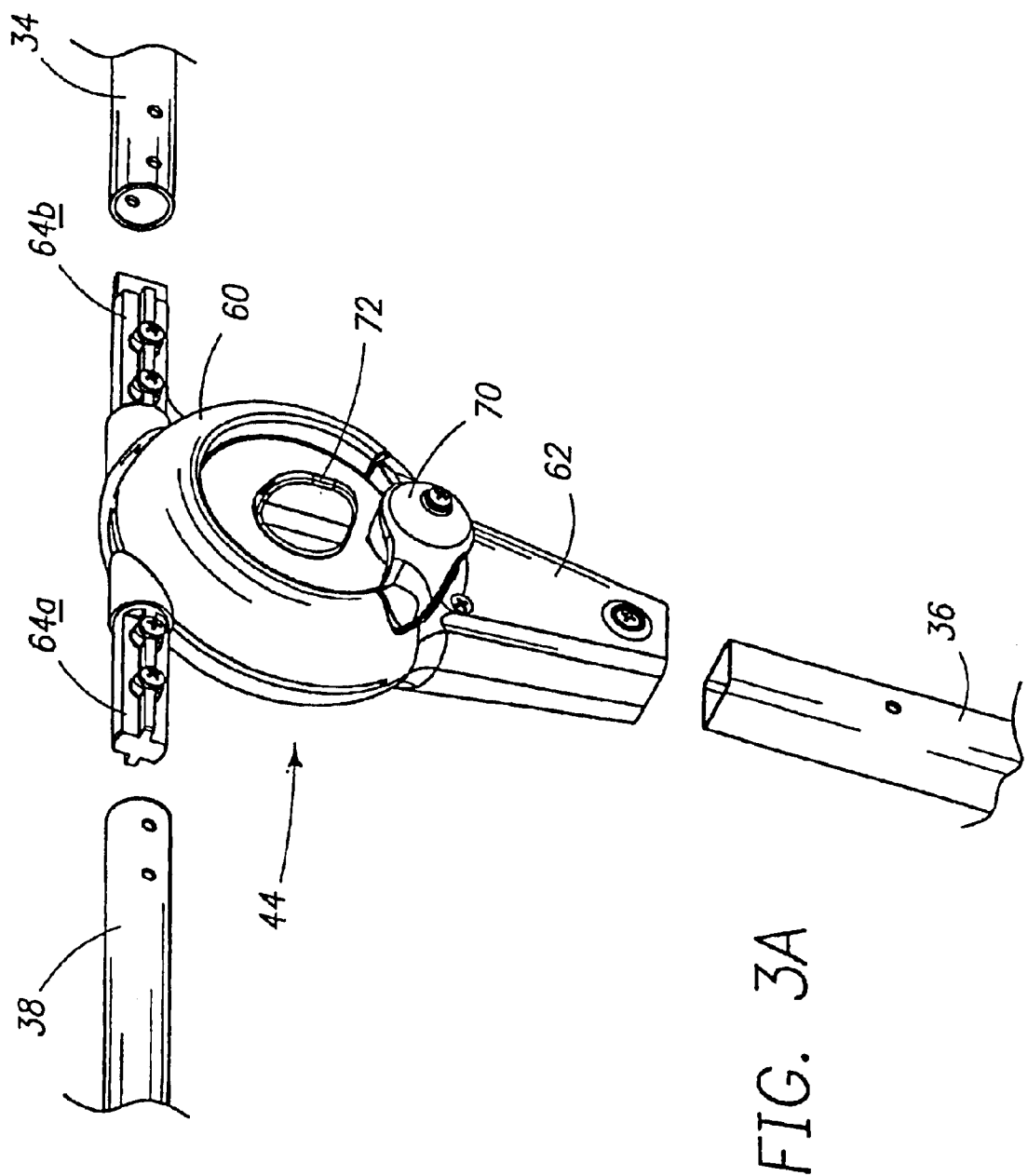
FIG. 3A is an isometric disassembled view of a hinge mechanism employed in the child carrier assembly of FIG. 1.

FIG. 3A shows hinge 44. Housing 60 has a lower receiving portion 62 that is rigidly, and permanently fastened to rear wheel support structure 36. Post members 64a and 64b are provided for connecting hinge assembly 44 to handle 38, and front fork 34, respectively. Switch device 70 is provided for allowing the operator to move carrier 30 between open and collapsed positions. Cam member 72 may be manipulated to adjust the position of handle 38 relative to the rest of the frame structure 32.

Figure 3B:
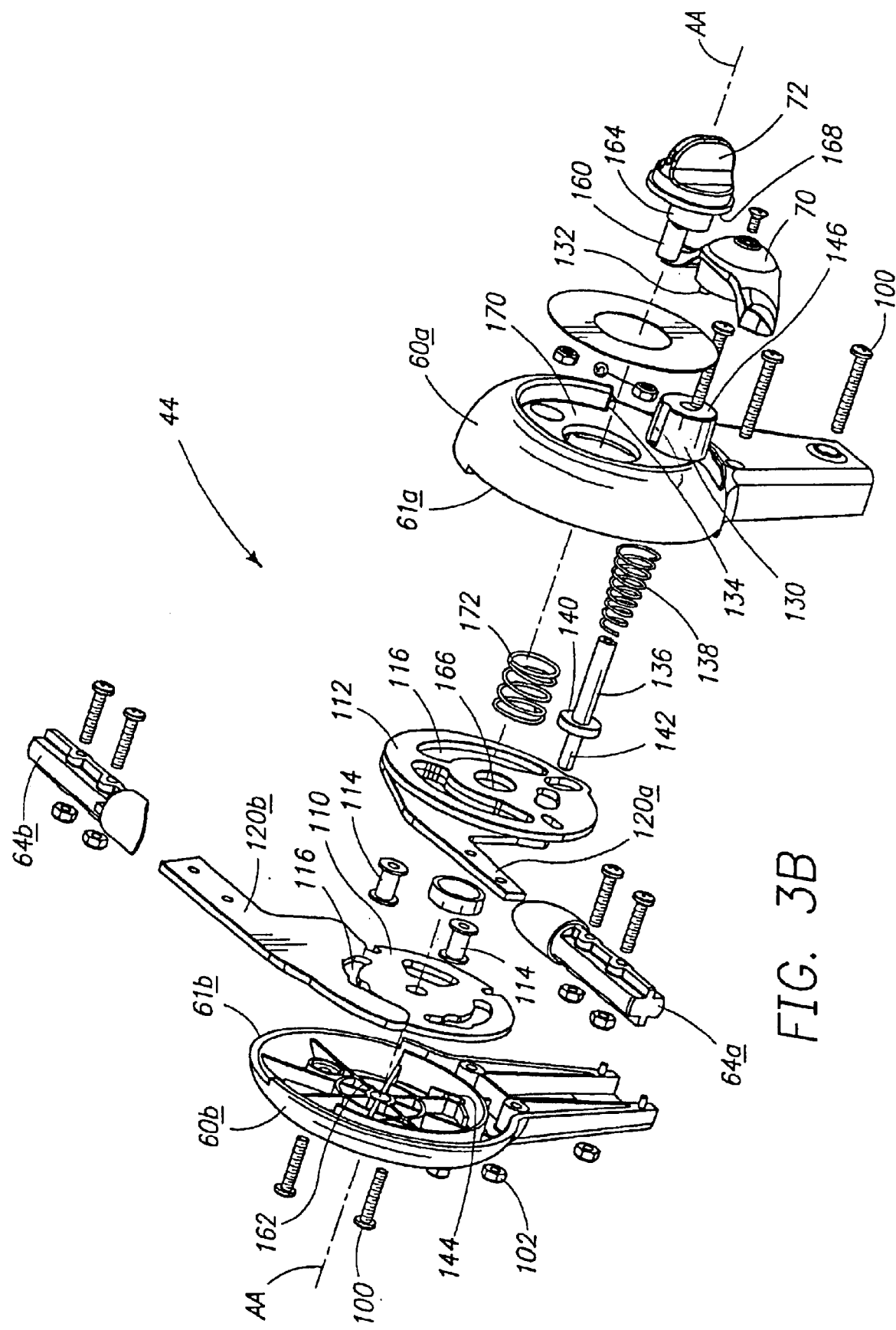
FIG. 3B is an exploded view of the hinge assembly shown in FIG. 3A.

FIG. 3B shows an exploded view of hinge 44. Housing 60 includes housing halves 60a and 60b which are secured together by bolts 100 and corresponding nuts 102. Housing 60 contains rotating circular disc 110 and rotating eccentric disc 112. Each of discs 110 and 112 may be selectively rotated around axis AA. Circular disc 110 rotates symmetrically around axis AA, while eccentric disc 112 rotates eccentrically around axis AA. Spool structures 114 fit into slots 116 in discs 110 and 112. Two of bolts 100 pass through spool structures 114. Discs 112 and 110 have blades 120a and 120b. Post members 64a and 64b are configured for mounting on blades 120a and 120b, respectively. Housing halves 60a and 60b have cut-out sections 61a and 61b for permitting a range of movement freedom for blades 120a and 120b, respectively, around axis AA. Switch device 70 is mounted pivotally on seat structure 130 on housing half 60a. Peg 132 on switch device 70 engages groove 134 of seat structure 130 when carrier 30 is locked in its upright, operable position. Switch device 70 is fastened to spring release pin 136. Spring 138 urges flange 140 on pin 136 away from an internal surface of seat structure 130. Distal tip 142 of pin 136 goes through holes and discs 110 and 112, and engages recess 144, inside housing half 60b, when carrier 30 is in its upright, operable position. The person may collapse carrier 30 by pulling switch device 70 substantially out of engagement with seating device 30, against the force of spring 138 until distal tip 142 of pin 136 no longer engages slots in discs 110 and 112. Switch device 70 can be rotated slightly so that pin 132 rests on external surface 146 of seat structure 130. This allows the user to use both hands to collapse carrier 30 without holding switch 70 from the unlocked position. Once carrier 30 is moved to either its open, or collapsed position, the user may rotate switch device 70 so that peg 132 can re-engage groove 134, allowing distal tip 142 of pin 136 to thread slots in discs 110 and 112, and to re-engage recess 144 from housing half 60b, thereby locking the orientation of discs 110 and 112, and respectively the orientations of front fork 34 and handle 38.

Hinge 44 provides an independent adjustment mechanism for altering the orientation of handle 38. Cam member 72 has a peg member 160 centered on axis AA. Peg member 160 goes through housing half 60a, discs 110 and 112, and is received in a central recess 162 of housing half 60b. Cam member 72 also has an eccentric portion 164 that fits into hole 166 of eccentric disc 112. Eccentric portion 164 and hole 166 are off-center from axis AA. Flange 168 of cam member 72 has a larger diameter than the hole in housing half 60a and is retained on the internal side of wall 170 of housing half 60a. Spring 172 forces flange 168 against the internal side of wall 170. Detail on the internal side of wall 170, and corresponding engagement detail on or around flange 168 make it possible to rotate cam member 72 between multiple positions by, first pushing or depressing cam member 72 against the action of spring 172 until cam member 72 is free to rotate. Cam member 72 is then rotated until engagement detail on flange 168 and the internal side of wall 170 permit cam member 72 to return to its locked position. Rotation of cam member 72 causes degrees of angular rotation of eccentric disc 112, without rotating circular disc 110. This results in a height adjustment of handle 38 relative to the rest of the frame.

Figure 4A:
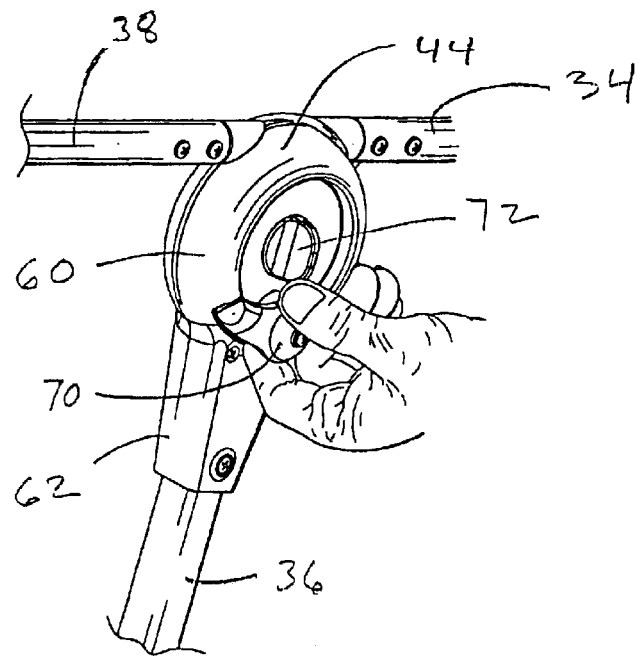
FIG. 4A is a partial perspective view of a person's hand manipulating a handle on a hinge mechanism for permitting collapse of the child carrier.
Figure 4B:
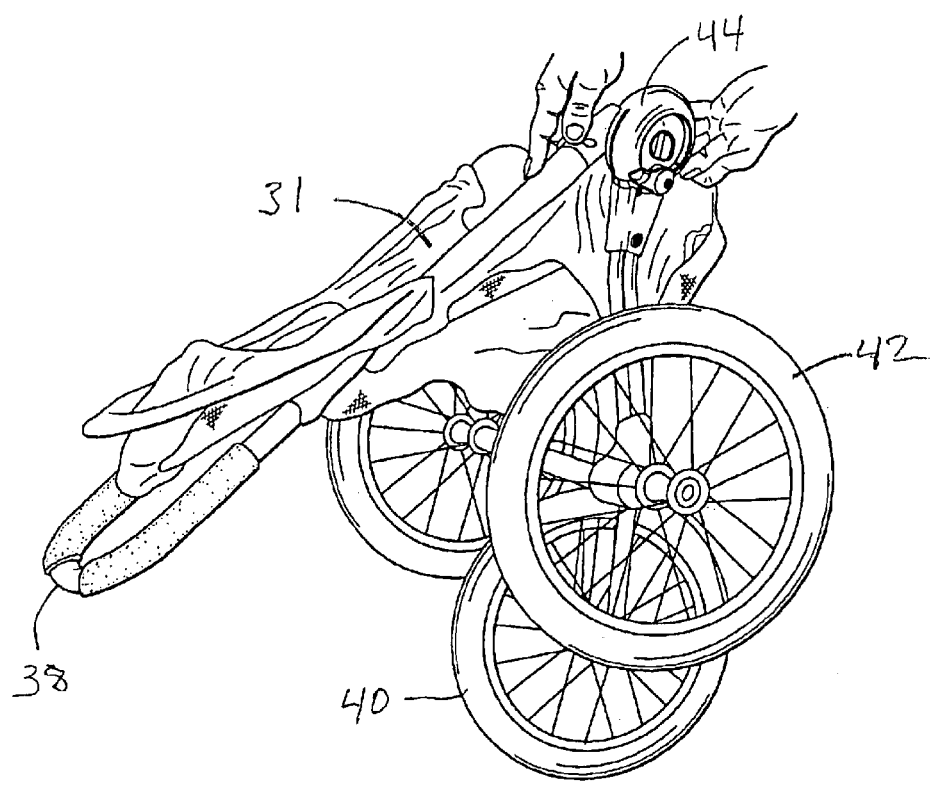
FIG. 4B is a perspective view of a collapsing child carrier.

FIGS. 4A and 4B show a method of collapsing child carrier 30. As shown in FIG. 4A, switch device 70 is pulled out and rotated. Handle 38 and front fork 34 are then free to rotate relative to wheel support structure 36, as shown in FIG. 4B.

Figure 5A:
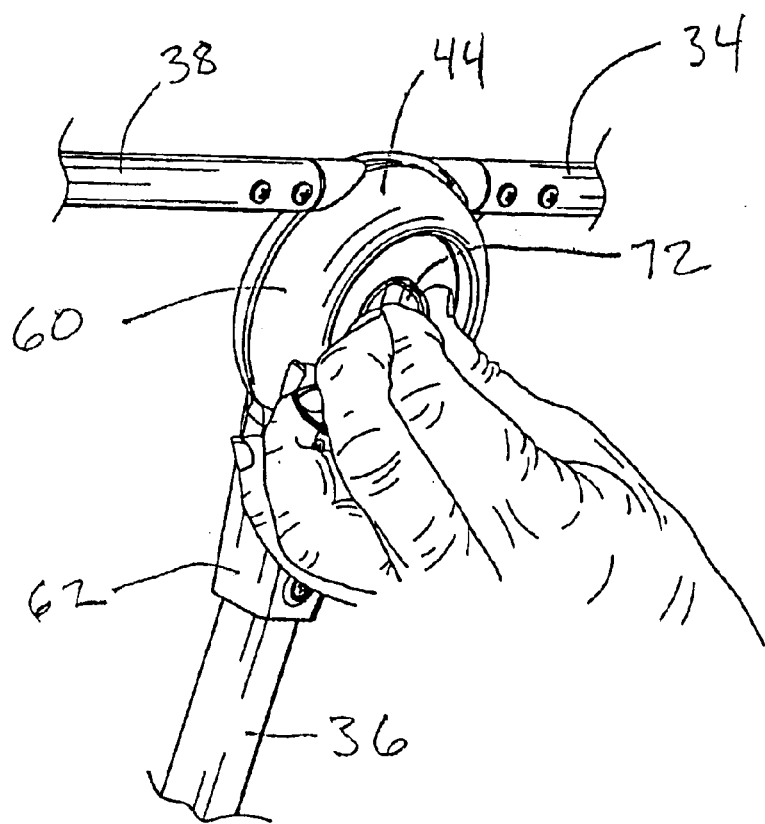
FIG. 5A is a perspective view of a person's hand manipulating a dial on a hinge to permit height adjustment of a handle bar on a child carrier.
Figure 5B:
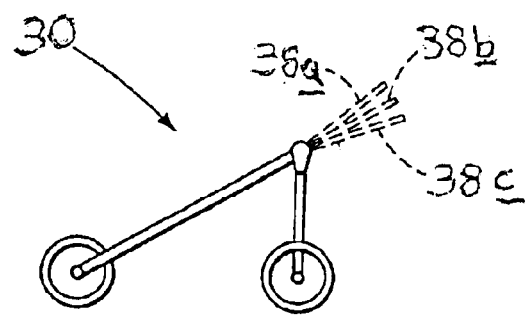
FIG. 5B is a schematic side view of a child carrier showing different handle positions in dashed lines.

FIG. 5A shows a person's hand turning cam member 72 to permit and control handle height adjustment. FIG. 5B shows handle 38 adjusted between three different positions 38a–c shown in dashed lines.

FIG. 6A shows an isometric view of axle support structure 50. Main body portion 240 is rigidly connected to rear wheel support, shown previously in FIGS. 1 and 2, via a connection mechanism 241. Axle receiving portion 242 is connected rigidly to fit main body portion 240. Hole 244 is provided in receiving portion 242 to receive a wheel axle, as shown in FIG. 5. Wheel disc 246 has grooves 248 for engaging wheel spokes so that wheel disc 246 rotates along with the respective rear wheel. Axle receiving portion 242 has a slot in which braking disc portion 252 is rotatable between a braking position and a non-braking position. Foot peg 254 is provided so a person can easily rotate braking disc portion 252 by pushing or pulling peg 254 by foot or by hand.

Figure 6B:
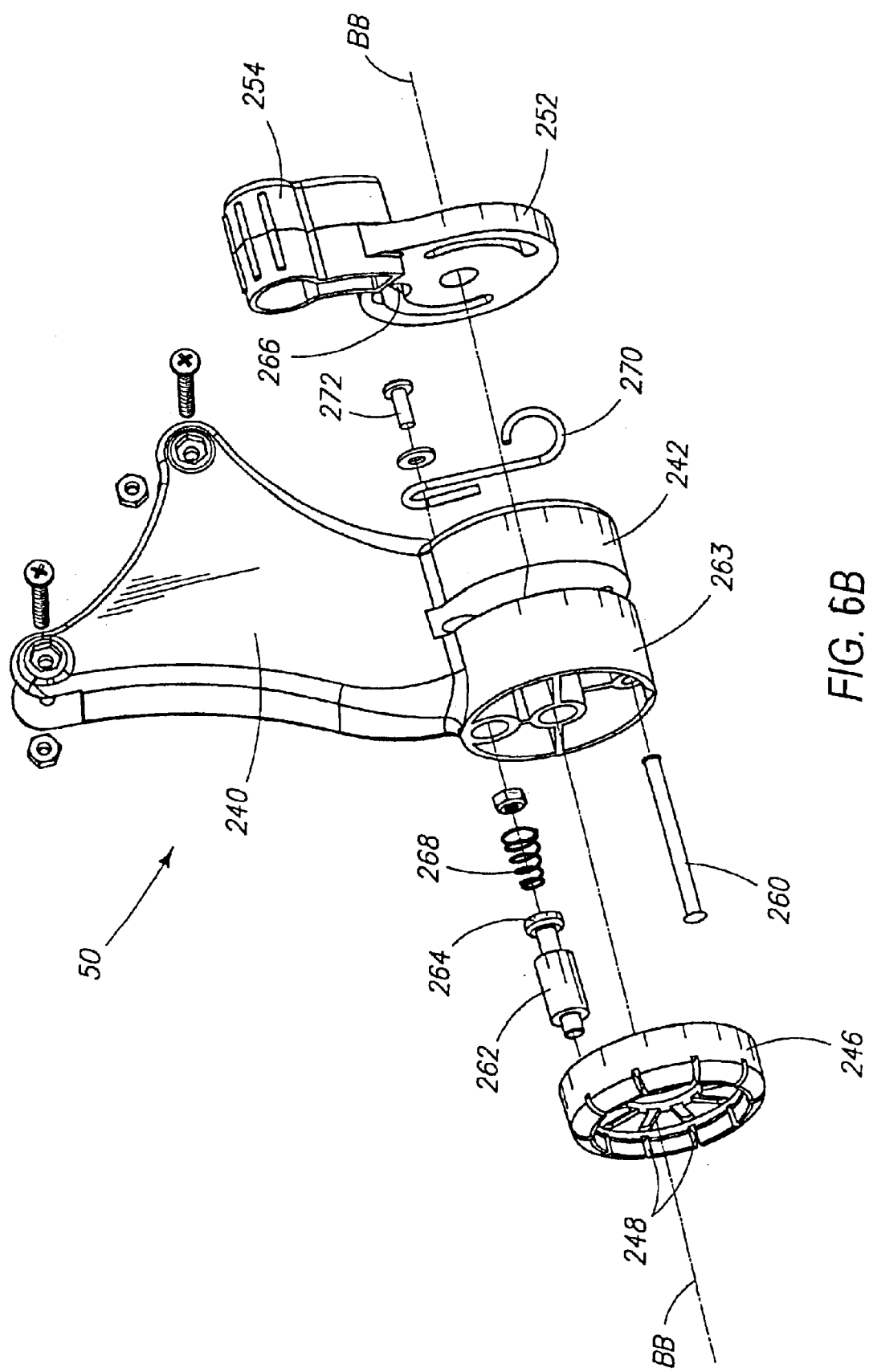
FIG. 6B is an exploded view of the axle support and braking device shown in FIG. 6A.

FIG. 6B shows an exploded view of axle support structure 50. Rivet structure 260 structurally stabilizes axle receiving portion 242 through braking disc portion 252. Locking pin 262 is movable along a transverse axis parallel to axis BB in and out of engagement with holes (not shown) provided on the back side of wheel disc 246. Head 264 of pin 262 passes through first portion 263 of axle receiving portion 242, and into cam recess 266 in braking disc portion 252. Cam recess 266 is configured so that when peg 254 rotates around axis BB, pin 262 moves transversely in and out of engagement with locking holes on the back side of wheel disc 246. Spring 268 is situated inside cam recess 266 to urge pin 262 towards locking engagement with wheel disc 246.

Retainer structure 270 is fastened by screw 272 onto axle receiving portion 270 so that the middle portion of retainer 270 is urged toward axis BB which is in line with the wheel axle. As shown in FIG. 5, wheel 42 is mounted on rear axle 300. Distal tip member 302 has an inclined surface so that when it is inserted through hole 234 it displaces the middle portion of retainer 270 until retainer 270 falls into slot 304 on axle 300, thereby locking wheel 42 into operable position in axle support structure 50. When a person wants to remove wheel 42 from axle support structure 50, the person pulls the round portion of retainer 270 out of slot 304 so that wheel 42 can be removed.

Figure 7:
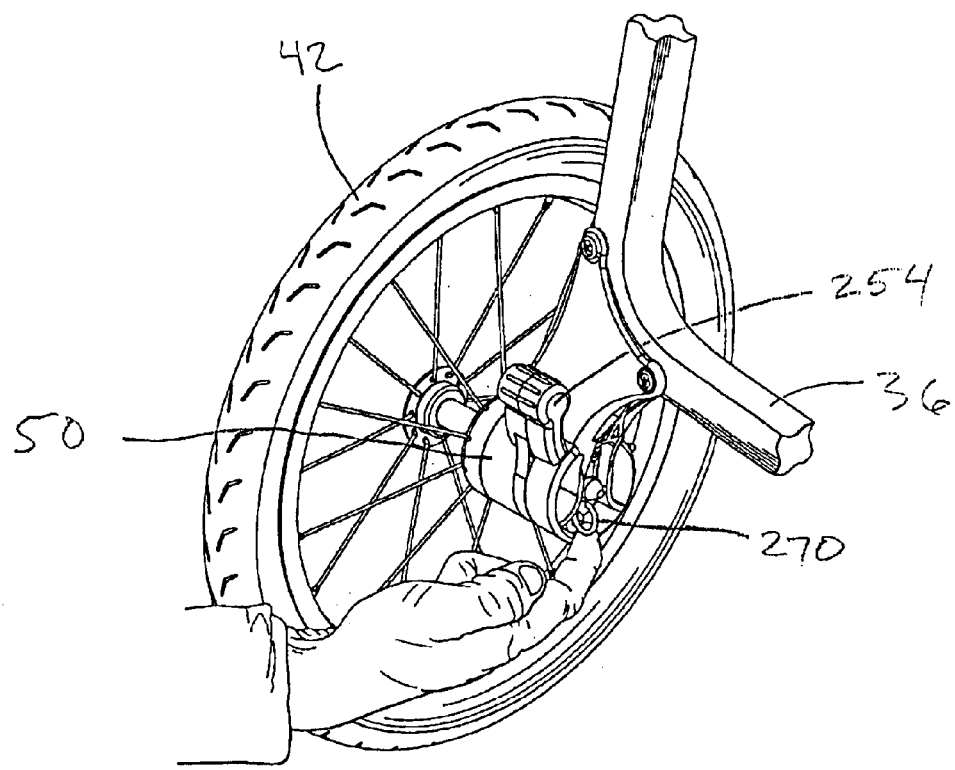
FIG. 7 is a perspective view of a person's hand manipulating a wheel retention device.
Figure 8:
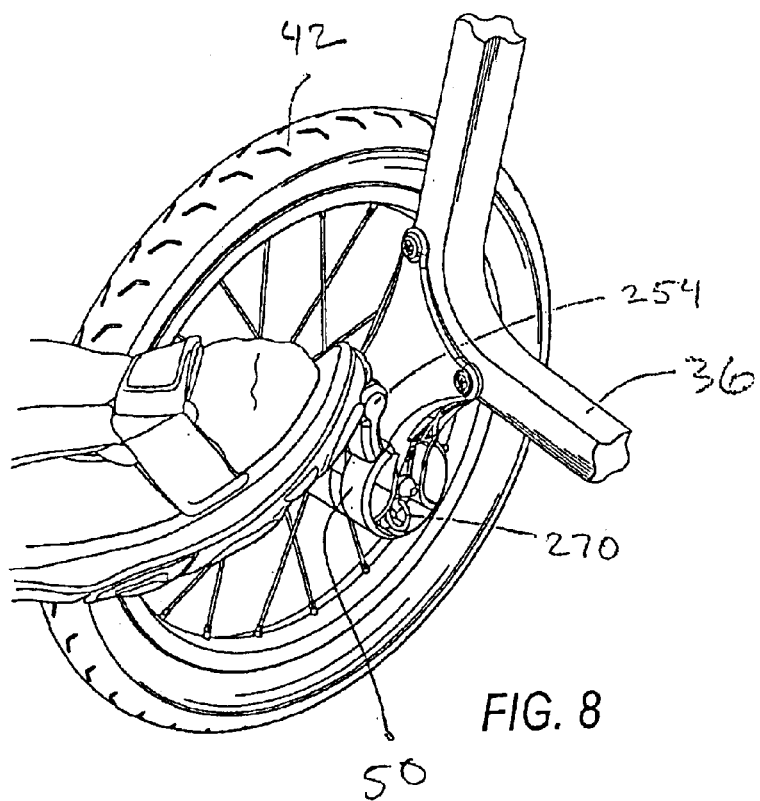
FIG. 8 is a perspective view of a person's foot controlling a wheel brake.

FIG. 7 shows a person's hand releasing retainer 270 so that wheel 42 can be removed from axle support structure 50. FIG. 8 shows a person's toe moving foot peg 254 to control the rear wheel braking system.

The specific embodiments disclosed and illustrated herein should not be considered as limiting the scope of the invention, as understood by a person having ordinary skill in the art. Numerous variations are possible without falling outside the scope of the appended claims. The subject matter of the invention includes all novel and nonobvious combinations and subcombinations of the various elements, features, functions, and/or properties disclosed herein.

We claim:

1. A child carrier having a front and a rear, comprising:
 a frame structure including a front fork assembly, a rear support structure, and a handle portion,
 a seat connected to the frame structure,
 a front wheel connected to the front fork assembly, and
 a pair of rear wheels connected to the rear support structure,
 first and second lateral hinge assemblies connecting the front fork assembly, the rear support structure, and the handle portion, the hinge assemblies defining a rotational transverse axle,
 wherein the handle portion is adjustable between plural operating positions and at least one collapsed position by pivoting around the rotational transverse axis, each of the plural operating positions being configured for pushing the carrier from the rear.

2. The child carrier of claim 1, wherein the rear support structure is substantially U-shaped.

3. The child carrier of claim 1, wherein the handle portion is substantially U-shaped.

4. The child carrier of claim 1, wherein the handle portion has plural operating positions arranged substantially along an arc.

5. The child carrier of claim 1, wherein the handle portion has plural operating positions arranged substantially along a line oriented vertically relative to the ground.

6. The child carrier of claim 1, wherein each rear wheel is connected to the rear support structure by an axle support having a brake device for selectively stopping or permitting rotation of the rear wheel.

7. A child carrier comprising a frame structure, including a front fork assembly, a rear support structure, and a handle portion, a seat connected to the frame structure, a front wheel connected to the front fork assembly, a pair of rear wheels connected to the rear support structure, and first and second lateral hinge assemblies connecting the front fork assembly, the rear support structure, and the handle portion, wherein the handle portion is selectively adjustable between plural operating positions and at least one collapsed position each hinge assembly having a first handle device for freeing the carrier to move between collapsed and operable positions, and a second handle for adjusting the operable position of the handle.

8. The child carrier of claim 7, wherein the rear support structure is substantially U-shaped.

9. The child carrier of claim 7, wherein the handle portion is substantially U-shaped.

10. The child carrier of claim 7, wherein the plural operating positions of the handle plural are arranged substantially along an arc.

11. The child carrier of claim 7, wherein the plural operating positions of the handle are arranged substantially along a line oriented vertically relative to the ground.

12. The child carrier of claim 7, wherein each rear wheel is connected to the rear support structure by an axle support having a brake device for selectively stopping or permitting rotation of the rear wheel.

13. A child carrier having a front and a rear, comprising:

a frame structure including a front fork assembly, a rear support structure, and a handle portion, first and second lateral hinges connecting the front fork assembly, the rear support structure, and the handle portion a seat connected to the frame structure, a front wheel connected to the front fork assembly, and a pair of rear wheels connected to the rear support structure, wherein the hinge assemblies permit selective rotation of the handle portion between plural operating positions around a transverse axis, while maintaining a locked orientation between the front fork assembly and the rear support structure, each of the plural operating positions being configured for pushing the carrier from the rear.

14. A child carrier, comprising:

a frame structure including a front fork assembly, a rear support structure, and a handle portion, a seat connected to the frame structure, a front wheel connected to the front fork assembly, a pair of rear wheels connected to the rear support structure, and a pair of hinge devices connecting the front fork assembly, the rear support structure, and the handle portion, wherein each hinge device has a first handle device for freeing the carrier to move between collapsed and operable positions, each first handle device being movable to a position that allows a user to use both hands to collapse the carrier.

15. The child carrier of claim 14, wherein the hinge devices permit collapsing of the carrier so that the front fork assembly, rear support structure, and handle portion are substantially parallel to each other.

* * * * *